United States Patent
Park et al.

(10) Patent No.: US 11,115,157 B2
(45) Date of Patent: Sep. 7, 2021

(54) METHOD AND DEVICE FOR SCHEDULING UPLINK CONTROL CHANNEL IN NEXT GENERATION WIRELESS NETWORK

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Seongnam-si (KR)

( * ) Notice: Subject to any disclaimer, the term of this patent is extended or adjusted under 35 U.S.C. 154(b) by 160 days.

(21) Appl. No.: 16/344,947

(22) PCT Filed: Oct. 27, 2017

(86) PCT No.: PCT/KR2017/011958
§ 371 (c)(1),
(2) Date: Apr. 25, 2019

(87) PCT Pub. No.: WO2018/080212
PCT Pub. Date: May 3, 2018

(65) Prior Publication Data
US 2019/0268103 A1    Aug. 29, 2019

(30) Foreign Application Priority Data

Oct. 27, 2016  (KR) .......... 10-2016-0141451
Oct. 11, 2017  (KR) .......... 10-2017-0130023
Oct. 25, 2017  (KR) .......... 10-2017-0139598

(51) Int. Cl.
*H04L 1/18*      (2006.01)
*H04W 72/12*   (2009.01)
(Continued)

(52) U.S. Cl.
CPC .............. *H04L 1/1812* (2013.01); *H04L 1/18* (2013.01); *H04L 5/0055* (2013.01); *H04L 27/00* (2013.01);
(Continued)

(58) Field of Classification Search
None
See application file for complete search history.

(56) References Cited

U.S. PATENT DOCUMENTS 8,879,479 B2 * 11/2014 Baker .................. H04L 5/0091
370/329
9,608,775 B2 *  3/2017 Kim ....................... H04L 41/08
(Continued)

FOREIGN PATENT DOCUMENTS

| KR | 10-2015-0035291 A | 4/2015 |
| WO | 2015/169397 A1 | 11/2015 |
| WO | 2016/137532 A1 | 9/2016 |

OTHER PUBLICATIONS

Samsung, "Support of Flexible Scheduling Timing", R1-1609133, 3GPP TSG RAN WG1 #86bis, Lisbon, Portugal, Oct. 10-14, 2016, pp. 1-4.
(Continued)

*Primary Examiner* — Phung M Chung
(74) *Attorney, Agent, or Firm* — Invenstone Patent, LLC

(57) ABSTRACT

The disclosure provides a method for scheduling an uplink control channel (PUCCH) in a next generation/5G wireless access network. The method of a terminal for scheduling a PUCCH may include: receiving, from a base station, timing relationship setting information between a downlink data channel (PDSCH) and a PUCCH; and scheduling the PUCCH on the basis of the timing relationship setting information.

13 Claims, 6 Drawing Sheets

(51) Int. Cl.
  *H04L 5/00* (2006.01)
  *H04L 27/00* (2006.01)
(52) U.S. Cl.
  CPC .... *H04W 72/1268* (2013.01); *H04W 72/1284* (2013.01)

(56) References Cited

U.S. PATENT DOCUMENTS

| | | | |
|---|---|---|---|
| 9,832,732 B2* | 11/2017 | Ouchi | H04W 52/245 |
| 10,602,490 B2* | 3/2020 | Nakashima | H04L 1/0026 |
| 10,820,300 B2* | 10/2020 | Noh | H04L 5/0053 |
| 2004/0160936 A1 | 8/2004 | Liu et al. | |
| 2014/0204854 A1 | 7/2014 | Freda et al. | |
| 2015/0092632 A1 | 4/2015 | Park | |
| 2015/0249980 A1* | 9/2015 | You | H04L 5/001 370/329 |
| 2016/0211951 A1 | 7/2016 | Park | |
| 2017/0055181 A1 | 2/2017 | Tiirola et al. | |
| 2017/0085346 A1 | 3/2017 | Tiirola et al. | |
| 2017/0164361 A1 | 6/2017 | Park | |
| 2018/0020462 A1 | 1/2018 | Xiong et al. | |
| 2018/0098312 A1* | 4/2018 | Lin | H04L 5/0007 |
| 2018/0152954 A1 | 5/2018 | Golitschek Edler Von Elbwart et al. | |
| 2018/0219654 A1 | 8/2018 | Chen et al. | |
| 2019/0053232 A1 | 2/2019 | Park | |
| 2019/0074935 A1 | 3/2019 | Babaei et al. | |
| 2019/0090218 A1 | 3/2019 | Noh et al. | |
| 2019/0090225 A1 | 3/2019 | Tang | |
| 2019/0208482 A1 | 7/2019 | Tooher et al. | |
| 2020/0029307 A1 | 1/2020 | Takeda et al. | |
| 2020/0045684 A1 | 2/2020 | Futaki | |
| 2020/0128578 A1 | 4/2020 | Park et al. | |
| 2020/0274646 A1 | 8/2020 | Du | |

OTHER PUBLICATIONS

Zte et al., "About Slot structure and Scheduling Units for NR", R1-1608964, 3GPP TSG RAN WG1 Meeting #86bis, Lisbon, Portugal, Oct. 10-14, 2016, pp. 1-8.
Catt, "NR DL control channel design considerations", R1-1608791, 3GPP TSG RAN WG1 #86bis, Lisbon, Portugal Oct. 10-14, 2016, pp. 1-5.
Huawei, "Email discussion [87-24] on sTTI scheduling", R1-17xxxxx, 3GPP TSG RAN WG1 Meeting #88, Athens, Greece, Feb. 13-17, 2017, pp. 1-14.
Ericsson, "Summary of e-mail discussions on downlink control signaling", R1-1701036, TSG-RAN WG1 NR AdHoc Spokane, WA, USA, Jan. 16-20, 2017, pp. 1-18.
LG Electronics, "Remaining details on supplementary UL in NR LTE coexistence", R1-1713221, 3GPP TSG RAN WG1 Meeting #90, Prague, Czech Republic, Aug. 21-25, 2017, pp. 1-4.
Zte et al., "On Indicating HARQ and PUCCH", R1-1608958, 3GPP TSG-RAN WG1 Meeting #86bis, Lisbon, Portugal, Oct. 10-14, 2016, pp. 1-3.
Huawei et al., "Discussion on slot and mini-slot", R1-1608837, 3GPP TSG RAN WG1 Meeting #86bis, Lisbon, Portugal, Oct. 10-14, 2016, pp. 1-4.
Samsung, "Carrier Aggregation for NR", R1-1609138, 3GPP TSG RAN WG1 #86bis, Lisbon, Portugal, Oct. 10-14, 2016, pp. 1-3.
European Patent Office, European Search Report of corresponding EP Patent Application No. 17865477.8, dated Apr. 16, 2020.
LG Electronics, "Discussion on potential HARQ operation in NR", R1-1609283, 3GPP TSG RAN WG1 meeting #86bis, Lisbon, Portugal, Oct. 10-14, 2016.
Huawei et al., "Way Forward on NR Carrier Aggregation", R1-1711846, 3GPP TSG RAN WG1 NR Ad-Hoc Meeting, Qingdao, China, Jun. 27-30, 2017.
European Patent Office, European Search Report of corresponding EP Patent Application No. 17865212.9, dated Apr. 8, 2020.

* cited by examiner

METHOD AND DEVICE FOR SCHEDULING UPLINK CONTROL CHANNEL IN NEXT GENERATION WIRELESS NETWORK

CROSS REFERENCE TO RELATED APPLICATIONS

This application is a National Stage Patent Application of PCT International Patent Application No. PCT/KR2017/011958 (filed on Oct. 27, 2017) under 35 U.S.C. § 371, which claims priority to Korean Patent Application Nos. 10-2016-0141451 (filed on Oct. 27, 2016), 10-2017-0130023 (filed on Oct. 11, 2017), and 10-2017-0139598 (filed on Oct. 25, 2017), the teachings of which are incorporated herein in their entireties by reference.

TECHNICAL FIELD

The present disclosure relates to methods of scheduling an uplink control channel (PUCCH) for hybrid automatic repeat request (HARQ) acknowledge/negative-acknowledge (ACK/NACK) feedback on a downlink data channel (PDSCH) in a next-generation/5G radio access network (hereinafter, referred to as a new radio (NR)) that is under discussion in the 3rd generation partnership project (3GPP).

BACKGROUND ART

Recently, the 3GPP has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

In particular, an enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR as flexible frame structures, compared with the LTE/LTE-Advanced.

Meanwhile, in order to support various scenarios, the NR supports a frame structure supporting a plurality of numerologies with subcarrier spacing (SCS) values different from one another and further supports scheduling time intervals different from one another. As a result, in the NR, in the case of defining timing relationship between downlink data reception and HARQ ACK/NACK feedback, it is unclear which numerology should be used to define timing relationship between a user equipment and a base station. Therefore, an ambiguity problem may occur.

DETAILED DESCRIPTION OF THE INVENTION

Technical Problem

An object of the present disclosure is to compose timing relationship configuration information based on a reference numerology in the case of supporting a plurality of numerologies in an NR system. Another object of the present disclosure is to provide a method of scheduling an uplink control channel (PUCCH) including HARQ ACK/NACK feedback information in response to a downlink data channel (PDSCH) between a user equipment and a base station based on the composed timing relationship configuration information.

Technical Solution

In accordance with an aspect of the present disclosure to address the above described issues, a method of a user equipment is provided for scheduling an uplink control channel (PUCCH). The method includes: receiving timing relationship configuration information between a downlink data channel (PDSCH) and the uplink control channel (PUCCH) from a base station, and scheduling the uplink control channel (PUCCH) based on the timing relationship configuration information. Wherein the uplink control channel (PUCCH) includes HARQ ACK/NACK feedback information on the downlink data channel (PDSCH), and a numerology used for receiving the downlink data channel (PDSCH) and a numerology used for transmitting the uplink control channel (PUCCH) are different from each other.

In accordance with another aspect of the present disclosure, a method of a base station is provided for scheduling an uplink control channel (PUCCH). The method includes: composing timing relationship configuration information between a downlink data channel (PDSCH) and the uplink control channel (PUCCH), and transmitting the timing relationship configuration information to a user equipment. The uplink control channel (PUCCH) includes HARQ ACK/NACK feedback information on the downlink data channel (PDSCH), and a numerology used for transmitting the downlink data channel (PDSCH) and a numerology used for receiving the uplink control channel (PUCCH) are different from each other.

In accordance with another aspect of the present disclosure, a user equipment is provided for scheduling an uplink control channel (PUCCH). The user equipment includes: a receiver configured to receive timing relationship configuration information between a downlink data channel (PDSCH) and the uplink control channel (PUCCH) from a base station, and a controller configured to schedule the uplink control channel (PUCCH) based on the timing relationship configuration information. The uplink control channel (PUCCH) includes HARQ ACK/NACK feedback information on the downlink data channel (PDSCH), and a numerology used for receiving the downlink data channel (PDSCH) and a numerology used for transmitting the uplink control channel (PUCCH) are different from each other.

In accordance with another aspect of the present disclosure, a base station is provided for scheduling an uplink control channel (PUCCH). The base station includes: a controller configured to compose timing relationship configuration information between a downlink data channel (PDSCH) and the uplink control channel (PUCCH), and a transmitter configured to transmit the timing relationship configuration information to a user equipment. Wherein the uplink control channel (PUCCH) includes HARQ ACK/NACK feedback information on the downlink data channel (PDSCH), and a numerology used for transmitting the downlink data channel (PDSCH) and a numerology used for receiving the uplink control channel (PUCCH) are different from each other.

Effects of the Invention

In accordance with at least one embodiment of the present disclosure, it is possible i) to compose timing relationship configuration information based on a reference numerology in the case of supporting a plurality of numerologies in an NR system, and ii) to provide a method of scheduling an uplink control channel (PUCCH) including HARQ ACK/NACK feedback information on a downlink data channel (PDSCH) between a user equipment and a base station based on the composed timing relationship configuration information.

BEST MODE FOR CARRYING OUT THE INVENTION

Figure 1:
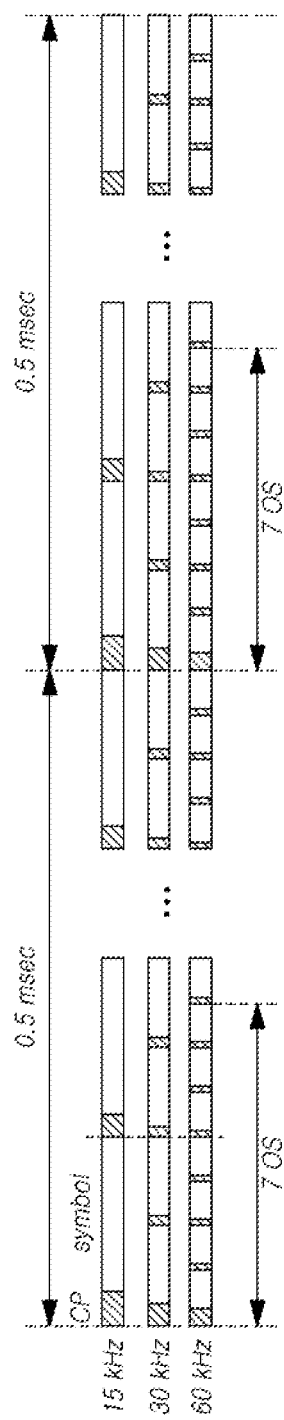
FIG. 1 is a diagram illustrating arrangements of orthogonal frequency division multiple (OFDM) symbols in a case of using different subcarrier spacings according to at least one embodiment of the present disclosure.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, a wireless communication system refers to a system for providing various communication services such as a voice communication service, a packet data service, etc. The wireless communication system includes user equipment (UE) and a base station (BS).

The UE is a generic term referring to devices used in wireless communication. For example, the UE may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The BS or a cell generally refers to a station communicating with the UE. The BS or the cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of the various cells is controlled by a BS. Therefore, the BS may be classified into two categories. 1) The BS may be referred to an apparatus that forms and provides a corresponding communication service area, such as a megacell, a macrocell, a microcell, a picocell, a femtocell, and a small cell, or 2) the BS may be referred to a communication service area. In the case of 1), the BS may be referred to i) apparatuses that form and provide any corresponding communication service area and are controlled by the same entity, or ii) apparatus that interact and cooperate with each other for forming and providing the corresponding communication service area. According to communication schemes employed by a BS, the BS may be referred to as a point, a transmission/reception point, a transmission point, a reception point, or the like. In case of 2), the BS may be a communication service area itself where UEs able to receive signals from or transmit signals to other UEs and neighboring BSs.

In the present disclosure, the cell may also refer to a coverage of a signal transmitted from a transmission/reception point, a component carrier having the coverage of a signal transmitted from a transmission point or a transmission/reception point, or a transmission/reception point itself.

The UE and the BS are two entities for performing transmission/reception used to embody the technology and technical spirit described in the present specification. The UE and the BS are a generic term and not limited to specific terms or words.

Herein, the uplink (UL) refers to data transmission/reception by a UE to/from a BS, and the downlink (DL) refers to data transmission/reception by a BS to/from a UE.

UL transmission and DL transmission may be performed by employing i) a time division duplex (TDD) technique performing transmission through different time slots, ii) a frequency division duplex (FDD) technique performing transmission through different frequencies, or ii) a hybrid technique of the frequency division duplex (FDD) and the time division duplex (TDD).

Further, the related standard of the wireless communication system defines configuring the UL and the DL based on a single carrier or a pair of carriers.

The UL and the DL transmit control information through one or more control channels, such as a physical DL control channel (PDCCH), a physical UL control channel (PUCCH), and the like. The UL and DL transmit data through data channels, such as a physical DL shared channel (PDSCH), a physical UL shared channel (PUSCH), and the like.

The DL may denote communication or a communication path from multiple transmission/reception points to a UE, and the UL may denote communication or a communication path from the UE to the multiple transmission/reception points. In the DL, a transmitter may be a part of multiple transmission/reception points, and a receiver may be a part of a UE. In the UL, a transmitter may be a part of a UE, and a receiver may be a part of multiple transmission/reception points.

Hereinafter, transmission and reception of a signal through a channel such as the PUCCH, the PUSCH, the PDCCH, or the PDSCH, may be described as the transmission and reception of the channel, such as the PUCCH, the PUSCH, the PDCCH, or the PDSCH.

Meanwhile, higher layer signaling includes radio resource control (RRC) signaling transmitting RRC information containing an RRC parameter.

The BS performs DL transmission to UEs. The BS may transmit a physical DL control channel for transmitting i) DL control information, such as scheduling required to receive a DL data channel that is a primary physical channel for unicast transmission, and ii) scheduling approval information for transmission through an UL data channel. Hereinafter, transmitting/receiving a signal through each channel may be described in such a manner that a corresponding channel is transmitted/received.

Any of multiple access techniques may be applied to the wireless communication system, and therefore no limitation is imposed on them. For example, the wireless communication system may employ various multiple access techniques, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

At least one embodiment of the present disclosure may be applied to resource allocation in i) asynchronous wireless communication evolving into LTE/LTE-advanced and IMT-2020 from GSM, WCDMA, and HSPA, ii) synchronous wireless communication evolving into CDMA, CDMA-2000, and UMB.

In the present disclosure, a machine type communication (MTC) terminal may refer to a terminal supporting low costs (or low complexity), a terminal supporting coverage enhancement, or the like. As another example, the MTC terminal may refer to a terminal defined as a predetermined category for supporting low cost (or low complexity) and/or coverage enhancement.

In other words, the MTC terminal may refer to a low cost (or low complexity) UE category/type newly defined in 3GPP Release-13 and performing LTE-based MTC-related operations. The MTC terminal may refer to a UE category/type defined in or before 3GPP Release-12, which supports enhanced coverage in comparison with the typical LTE coverage or supports low power consumption. Or, the MTC device may refer to a low cost (or low complexity) UE category/type newly defined in Release-13. The MTC terminal may refer to a further enhanced MTC terminal defined in Release-14.

In the present disclosure, a narrowband Internet of Things (NB-IoT) terminal refers to a terminal supporting radio access for cellular IoT. NB-IoT technology aims at improved indoor coverage, support for large-scale low-speed terminals, low latency sensitivity, very low terminal costs, low power consumption, and optimized network architecture.

An enhanced mobile broadband (eMBB), massive machine-type communication (mMTC), and ultra reliable and low latency communication (URLLC) are proposed as representative usage scenarios for NR on which discussions are in progress in the 3GPP.

A frequency, a frame, a subframe, a resource, a resource block (RB), a region, a band, a sub-band, a control channel, a data channel, a synchronization signal, various reference signals, various signals, and various messages associated with NR of the present disclosure may be interpreted as being used in the past or present or as various meanings to be used in the future.

NR (New Radio)

Recently, the 3GPP has approved the "Study on New Radio Access Technology", which is a study item for research on next-generation/5G radio access technology. On the basis of the Study on New Radio Access Technology, discussions have been in progress for frame structures, channel coding and modulation, waveforms, multiple access methods, and the like for the new radio (NR).

It is required to design the NR not only to provide improved data transmission rates compared with the long term evolution (LTE)/LTE-Advanced, but also to meet various requirements in detailed and specific usage scenarios. In particular, an enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have a flexible frame structure compared with the LTE/LTE-Advanced.

Specifically, the eMBB, mMTC, URLLC are considered as representative usage scenarios of the NR by the 3GPP. Each usage scenario imposes different requirements for data rates, latency, coverage, etc. Accordingly, there is a growing need for a technique of efficiently multiplexing a radio resource unit based on numerologies (e.g., a subcarrier spacing (SCS), a subframe, a transmission time interval (TTI), etc.) different from one another, as a method for efficiently satisfying requirements of each usage scenario through a frequency band used by an arbitrary NR system.

To this end, discussions also have been conducted for developing i) techniques of supporting the requirements by multiplexing one NR carrier based on at least one numerology having subcarrier spacing (SCS) values different from one another by employing TDM, FDM or TDM/FDM, and ii) techniques of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms. Unlike the LTE, since the subframe of the NR is an absolute reference time duration, a slot and a minislot may be defined as a time unit served as a basis of actual UL/DL data scheduling. In this case, the number of OFDM symbols forming a slot, a value of y, has been defined as y=14, regardless of the numerology.

Therefore, a slot may be formed of 14 symbols. In addition, according to transmission direction for a corresponding slot, all symbols may be used for DL transmission or UL transmission, or the symbols may be used in the configuration of a DL portion+a gap+an UL portion.

Further, a minislot formed of fewer symbols than the slot has been defined in a numerology (or SCS). As a result, a time-domain scheduling interval with a short length may be configured for UL/DL data transmission/reception based on the minislot. In addition, a time-domain scheduling interval with a long length may be configured for UL/DL data transmission/reception by slot aggregation.

Timing relationship between control information and data in the NR

In the NR, as a method of determining HARQ ACK/NACK feedback timing with respect to DL data reception of a UE, it is considered that the feedback timing is i) dynamically configured by L1 signaling (e.g. DCI), ii) semi-statically configured through higher layer, or iii) configured in combination of the higher layer and the dynamical L1 signaling.

In addition, as a method of determining timing between UL assignment and corresponding UL data transmission, it is also considered that the timing is i) dynamically configured by L1 signaling (e.g. DCI), ii) semi-statically configured through higher layer, or iii) configured in combination of the higher layer and the dynamical L1 signaling.

In addition, although no discussions have been conducted, it may be considered that timing between DL assignment and corresponding DL data reception is i) dynamically configured by L1 signaling (e.g. DCI), ii) semi-statically configured through higher layer, or iii) configured in combination of the higher layer and the dynamical L1 signaling.

The following is discussions related to this issue.
Timing relationship between DL data reception and corresponding acknowledgement can be one or more of:
dynamically indicated by L1 signaling (e.g., DCI))
semi-statically indicated to a UE via higher layer
a combination of indication by higher layers and dynamic L1 signaling (e.g., DCI))
FFS (further study): minimum interval between DL data reception and corresponding acknowledgement
FFS: common channels (e.g. random access))
Timing relationship between UL assignment and corresponding UL data transmission can be one or more of:
dynamically indicated by L1 signaling (e.g., DCI))
semi-statically indicated to a UE via higher layer
a combination of indication by higher layers and dynamic L1 signaling (e.g., DCI))
FFS: minimum interval between UL assignment and corresponding UL data transmission
FFS: common channels (e.g. random access)

As described above, since the NR is designed to support a plurality of numerologies and support different scheduling time intervals (e.g., a slot or a mini-slot, or slot aggregation) from one another, it is necessary to solve ambiguity between a UE and a BS, which is resulted from defining i) timing relationship related to the DCI and corresponding DL/UL data timing, and ii) timing relationship related to DL data reception and corresponding HARQ ACK/NACK feedback timing.

In accordance with at least one embodiment of the present disclosure, proposed are methods of a BS and a UE for indicating and interpreting respectively i) timing between a DL control channel (i.e. NR PDCCH) for transmitting DL control information (DCI) including data scheduling information for any NR UE and corresponding DL or UL data reception, and ii) timing between DL data reception and corresponding HARQ ACK/NACK feedback of the UE.

Discussions have been conducted on a frame structure for supporting a plurality of numerologies with subcarrier spacing values different from one another in the NR. Specifically, in the NR, a method is under discussion for supporting a numerology family with subcarrier spacing values based on 15 kHz*2^n, and more specifically, it is considered to support the SCS cases of n=0, 1, 2, 3, 4, 5 as the n value. Thus, since a plurality of numerologies is supported in the NR, the lengths of OFDM symbols depending on SCS values for each numerology may be different as shown in FIG. 1, and the lengths of slots formed with an identical y value may be also different depending on SCS values. For example, for numerologies N1 and N2 formed with SCS values of 15 kHz and 30 kHz respectively, in even a case where the number of OFDM symbols forming one slot in each of the N1 and the N2, namely y, is set to 14, the lengths of the corresponding slots are respectively 1 ms and 0.5 ms.

Alternatively, time-domain scheduling intervals different from one another may be defined in an identical numerology, such as, defining a slot formed of 14 symbols as a unit of scheduling in the time domain for each UE, defining a minislot formed of fewer symbols than a slot, defining a time-domain scheduling unit through slot aggregation where a plurality of slots is aggregated, or the like.

Thus, it is necessary to achieve synchronization between the UE and a BS for interpreting information related to timing relationship configured by DCI or higher layer for the corresponding UE i) when it is possible to configure a plurality of time-domain scheduling intervals, ii) when a plurality of numerologies through a single NR frequency band is configured, iii) when different numerologies or scheduling spaces between the UL and the DL (e.g. a slot basis for the DL, a minislot basis for the UL) are configured, iv) when carrier aggregation (CA) is supported, or v) when different numerologies or scheduling spaces from one another between component carriers (CC) different from one another (e.g. slot basis for CC #1, minislot basis for CC #2) are configured.

For example, when a NR UE is configured to support carrier aggregation of CC #1 of 15 kHz SCS and CC #2 of 60 kHz SCS and when scheduling is performed based on a slot with y=14 in each of the CC #1 and the CC #2, a scheduling unit and a corresponding DL control channel monitoring unit in each CC may be 1 ms in the CC #1 and 0.25 ms in the CC #2. In this case, when timing relationship between the DCI and corresponding data or data and corresponding ACK/NACK feedback is configured with any k value, it is necessary to define whether the timing length served as the reference of the k is 1 ms or 0.25 ms.

For example, when information on timing relationship (e.g. timing gap information) between UL assignment and corresponding UL data transmission is defined to be dynamically configured through L1 signaling, namely corresponding UL assignment DCI, on a per scheduling interval basis, and when a timing gap, k, configured through the UL assignment DCI is applied to a corresponding UE, it is necessary to define clearly whether the scheduling interval served as a reference is i) a slot (e.g., 1 ms) formed of 14 symbols based on 15 kHz which is the scheduling interval of the CC #1 or ii) a slot (e.g., 0.25 ms) formed of 14 symbols based on 60 kHz which is the scheduling interval of the CC #2.

In particular, when cross-carrier scheduling is applied, it is necessary to interpret clearly any difference occurring between i) a time-domain scheduling interval for transmitting corresponding DCI and ii) a time-domain scheduling interval for transmitting corresponding data.

Embodiments described below may be applied to all UEs, BSs, and core network entities (MME) using mobile communication technologies. For example, embodiments of the present disclosure may be applied not only to mobile communication UEs employing long term evolution technology, but also to next generation mobile communication (5G mobile communication, New-RAT) UEs, BSs, and access and mobility functions (AMFs). For convenience of description, a BS may denote an eNB of LTE/E-UTRAN, or denote at least one of a central unit (CU), a distribute unit (DU), and an object in which the CU and the DU are implemented as one logical object, or a gNB, in a 5G radio network in which the CU is separated from the DU.

In addition, in the present disclosure, the numerology denotes numerical characteristics and numerical values for data transmission/reception. As described above, the numerology may be determined depending on a value of the subcarrier spacing (hereinafter, referred to as SCS or subcarrier spacing). Accordingly, that numerologies are different may mean that subcarrier spacings determining the numerologies are different.

In addition, an example of the timing relationship in the present disclosure may mean timing between i) a DL data channel (PDSCH) for receiving DL data of a UE and ii) an UL control channel (PUCCH) for transmitting corresponding HARQ ACK/NACK feedback to a BS.

Timing relationship configuration information means information used for configuring the timing relationship and may be expressed as timing granularity. The timing relationship configuration information may include information on the time domain scheduling interval (TTI) and a timing gap used for indicating it, a time unit, a slot length, a slot index, and a reference slot index.

The slot length in the present disclosure may be expressed as the number of OFDM symbols forming a slot or as a time occupied by the slot. For example, in case of using a numerology based on 15 kHz SCS, the length of one symbol may be expressed as 14 OFDM symbols, or expressed as 1 ms.

Figure 3:
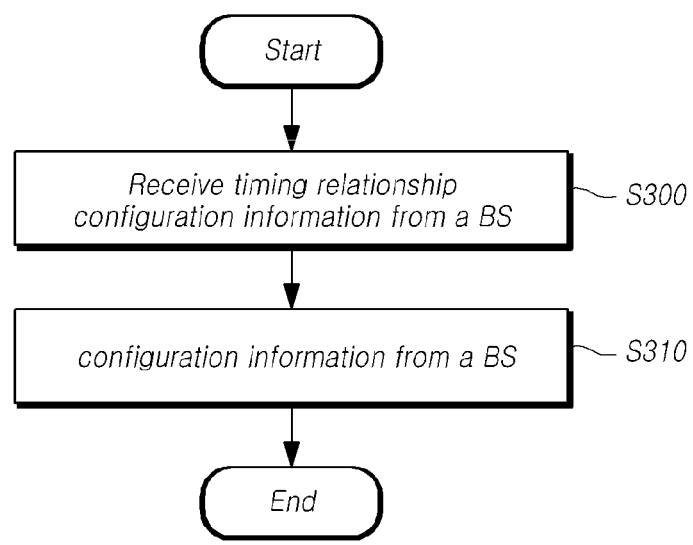
FIG. 3 is a flowchart illustrating a procedure of a user equipment for scheduling an uplink control channel (PUCCH) according to at least one embodiment of the present disclosure.

FIG. 3 is a flowchart illustrating a procedure of a UE for scheduling an uplink control channel (PUCCH) according to at least one embodiment of the present disclosure.

Referring to FIG. 3, the UE may receive timing relationship configuration information between a DL data channel (PDSCH) and an UL control channel (PUCCH) from a BS (S300). At this time, as described above, numerologies used by the UE in the UL and the DL may be different from each other. When the UE supports carrier aggregation, numerologies between respective component carriers may be different from each other. In addition, that numerologies are different means that subcarrier spacing values determining the numerologies are different, and therefore, subcarrier spacing values used by the UE in the UL and the DL may be different from each other.

For example, when a UE receives data through a DL data channel (PDSCH) and transmits corresponding HARQ ACK/NACK feedback information through an UL control channel (PUCCH), a subcarrier spacing value used for receiving the DL data channel may be different from a subcarrier spacing value used for transmitting the UL control channel.

At this time, if the UE uses carrier aggregation, a component carrier used for receiving the DL data channel may be different from a component carrier used for transmitting the UL control channel. On the contrary, if the UE does not use the carrier aggregation and if time domain scheduling intervals in the UL and the DL are configured different from each other, a carrier used for receiving the DL data channel may be the same as that used for transmitting the UL control channel. When the UL control channel is transmitted to a BS, the UL control channel may be transmitted through supplementary UL (SUL) used for transmitting the UL control channel.

In order to solve such an ambiguity problem in the timing relationship, the BS may compose timing relationship configuration information based on a reference numerology, and then the UE may receive and use the timing relationship configuration information from the BS.

The UE may receive the timing relationship configuration from the BS through DCI signaling. The UE may detect the DCI received through the DL control channel (PDCCH) and use the timing relationship configuration information contained in the DCI.

The UE may receive the timing relationship configuration information from the BS through high layer signaling. That is, it is possible for the UE to receive the timing relationship configuration information through UE-specific RRC signaling from the BS.

In addition, the UE may schedule the UL control channel based on the timing relationship configuration information received from the BS (S310). For example, when a timing gap value between data received through DL data channel and corresponding HARQ ACK/NACK feedback data is k, the UE may interpret the timing gap value based on a slot length defined in the timing relationship configuration information and schedule UL control channel based on the interpreted value.

At this time, the timing relationship configuration information may be composed in a slot unit based on the numerology used for transmitting the UL control channel. That is, when the UE interprets timing relationship between the DL data channel and the UL control channel including the corresponding HARQ ACK/NACK feedback information according to the timing relationship configuration information, the timing relationship may be interpreted based on a numerology used for transmitting the UL control channel. In this case, even though the DL data channel is transmitted on a per minislot basis, the UL data control channel may be transmitted only on a per slot basis.

Figure 4:
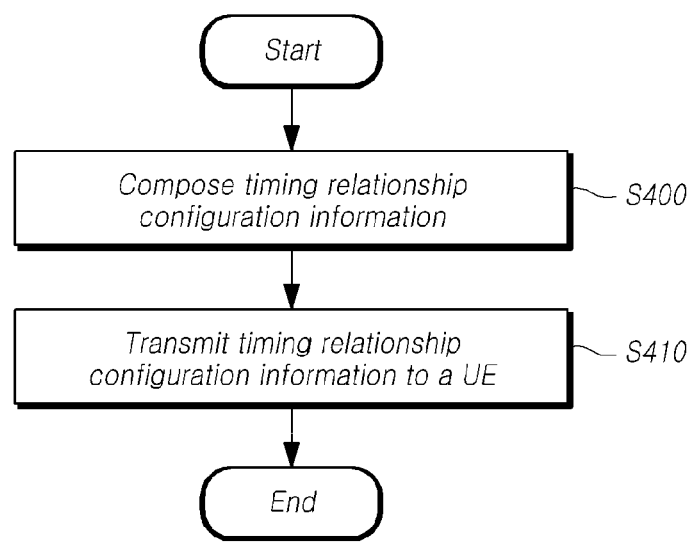
FIG. 4 is a flowchart illustrating a procedure of a base station for scheduling an uplink control channel (PUCCH) according to at least one embodiment of the present disclosure.

FIG. 4 is a flowchart illustrating a procedure of a BS for scheduling an UL control channel, according to at least one embodiment of the present disclosure.

Referring to FIG. 4, the BS may compose timing relationship configuration information between a DL data channel (PDSCH) and an UL control channel (PUCCH) (S400). At this time, as described above, numerologies used by any UE in the UL and the DL may be different from each other. When the UE supports carrier aggregation, numerologies between respective component carriers may be different from each other. In addition, that numerologies are different means that subcarrier spacings determining the numerologies are different, and therefore, subcarrier spacings used by the UE in the UL and the DL may be different from each other.

For example, when a BS transmits data through a DL data channel (PDSCH) to the UE and receives corresponding HARQ ACK/NACK feedback information through an UL control channel (PUCCH), a subcarrier spacing used for the DL data channel may be different from a subcarrier spacing used for the UL control channel.

At this time, when the UE uses carrier aggregation, a component carrier used for transmitting the DL data channel may be different from a component carrier used for receiving the UL control channel, by the BS. On the contrary, when the UE does not use the carrier aggregation, and when time domain scheduling intervals in the UL and the DL are configured different from each other, a carrier used for transmitting the DL data channel may be the same as that used for receiving the UL control channel. When the UL control channel is transmitted to the BS, the UL control channel may be transmitted through supplementary UL (SUL) used for transmitting the UL control channel.

In order to solve such an ambiguity problem in the timing relationship, the BS may compose timing relationship configuration information based on a reference numerology, and then the UE may receive and use the timing relationship configuration information from the BS.

In addition, the BS may transmit the timing relationship configuration information to the UE (S410). The BS may transmit the timing relationship configuration to the UE through DCI signaling. The UE may detect the DCI received through the DL control channel (PDCCH) and use the timing relationship configuration information contained in the DCI.

The BS may transmit the timing relationship configuration information to the UE through high layer signaling. That is, it is possible for the BS to transmit the timing relationship configuration information through UE-specific RRC signaling to the UE.

At this time, the timing relationship configuration information may be composed in a slot unit based on the numerology used for transmitting the UL control channel. That is, when the BS composes the timing relationship configuration information between the DL data channel and the UL control channel including the corresponding HARQ ACK/NACK feedback information, the timing relationship configuration information may be composed based on a numerology used for transmitting the UL control channel. In this case, even though the DL data channel is transmitted on a per minislot basis, the UL data control channel may be transmitted only on a per slot basis.

Hereinafter, methods of the UE and the BS for scheduling the UL control channel (PUCCH) described above will be discussed in detail in accordance with various embodiments.

The at least one example described above has been described based on a case in which time-domain scheduling intervals are different between the DCI and corresponding data transmission/reception because carrier aggregation is used. However, embodiments described below may be applied to all cases in which a time-domain scheduling intervals are different between the DCI and corresponding data transmission/reception. For example, the embodiments may be i) for a case where a DL numerology for transmitting UL assignment DCI and a UL numerology for transmitting corresponding data are configured differently or ii) for a case where a time-domain scheduling interval of the DL for transmitting the UL assignment DCI may be configured based on a slot and a time-domain scheduling interval for transmitting corresponding UL data may be configured based on a minislot.

In addition, the present disclosure may be applied to i) all cases where time-domain scheduling intervals for the DCI and corresponding data transmission are different or ii) all cases where time-domain scheduling intervals for DL data reception and an NR PUCCH configuration for corresponding HARQ ACK/NACK feedback UCI transmission are different.

Some embodiments described below may be configured individually or in any combination.

Embodiment 1. Data Transmission Numerology/Time-Domain Scheduling Interval (or TTI) Based Timing Relation Indication Regardless of a time-domain scheduling interval for transmitting and receiving UL assignment DCI or DL assignment DCI, the timing relationship related information may be defined to be configured by a BS or interpreted by a UE, based on an actual time-domain scheduling interval (or TTI) for transmitting UL data transmission or receiving DL data reception corresponding to the DCI.

For example, it is assumed that a NR UE is configured to support carrier aggregation (CA) of the CC #1 of 15 kHz SCS and the CC #2 of 60 kHz SCS. In this case, a time-domain scheduling interval for each CC is configured as follows. That is, when a time-domain scheduling interval based on a slot with y=14 is configured in CC #1 and a time-domain scheduling interval based on the slot with y=14 is also configured in CC #2, 1 ms time-domain scheduling interval (or TTI) may be configured in the CC #1 and 0.25 ms time-domain scheduling interval (or TTI) may be configured in the CC #2.

At this time, when cross-carrier scheduling is configured for transmitting scheduling control information (DCI) for an UL/DL data channel of the CC #2 through the CC #1, there occurs a difference between i) a time-domain scheduling interval (or TTI) of 0.25 ms served as a unit of data transmission/reception of the CC #2 and ii) a time-domain scheduling interval (or TTI) of 1 ms for transmitting the DCI through the CC #1. In this case, timing relationship (e.g., k value) between i) data of the CC #2 transmitted through the DCI or configured through higher layer and ii) the DCI including corresponding scheduling information may be defined to be set by a BS and to be interpreted by a UE based on a unit of the time-domain scheduling interval (or TTI) of the CC #2 for transmitting/receiving corresponding data. For example, when timing relationship related information is indication information on a timing gap between the DCI and corresponding data transmission/reception and when the timing gap is set to k, the timing relationship may be defined to perform corresponding data transmission/reception after k slots (i.e., through a slot of the first CC #2 after k*0.25 ms) based on a slot unit of 0.25 ms length of 60 kHz SCS which is the time-domain scheduling interval (or TTI) of the CC #2 for transmitting the DCI, not a slot unit of 1 ms length of 15 kHz SCS which is the time-domain scheduling interval (or TTI) of the CC #1 for transmitting the DCI.

As another example, methods are proposed for timing indication and timing interpretation with respect to a difference between i) the SCS value for transmitting the PDSCH and a corresponding DL slot length and ii) the SCS value for transmitting the PUCCH for HARQ ACK/NACK feedback of a UE and a corresponding UL slot length.

Figure 2:
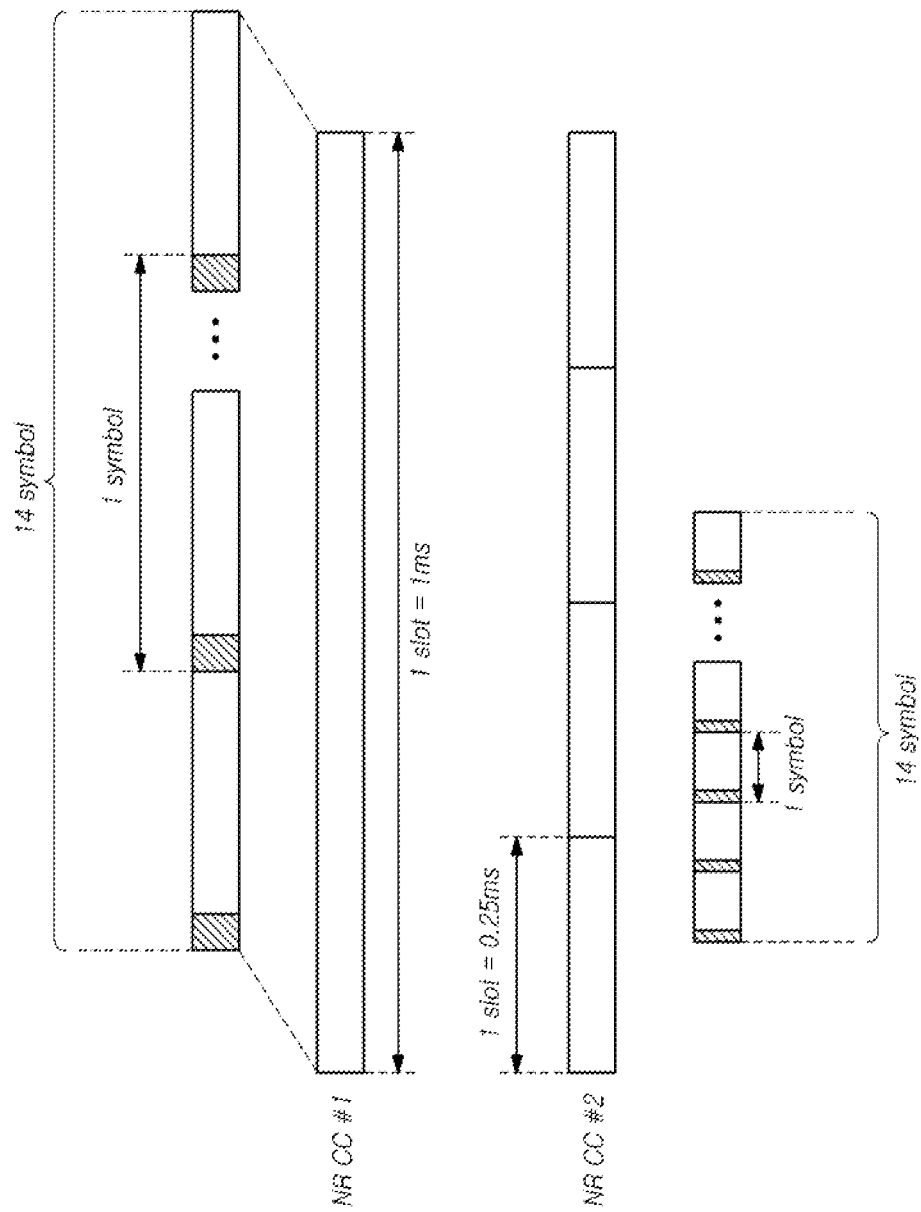
FIG. 2 is a diagram illustrating carrier aggregation of i) NR component carrier #1 with 15 kHz subcarrier spacing and i) NR component carrier #2 with 60 kHz subcarrier spacing, according to at least one embodiment of the present disclosure.

FIG. 2 is a diagram illustrating carrier aggregation of a NR component carrier #1 with 15 kHz subcarrier spacing and a NR component carrier #2 with 60 kHz subcarrier spacing, according to at least one embodiment of the present disclosure.

As illustrated in FIG. 2, when a UE supports carrier aggregation of i) NR CC #1 configured based on 15 kHz SCS of the normal CP and ii) NR CC #2 configured based on 60 kHz SCS of the normal CP and when 1 slot is defined to include 14 OFDM symbols in normal CP cases, a slot length in the NR CC #1 is 1 ms, and a slot length in the NR CC #2 is 0.25 ms, which are different from each other.

In addition, in the case of the NR CC #2, a DL (or UL) slot may be formed by an NR carrier/cell established in a high-frequency band, and the NR CC #1 may be configured by a carrier/cell, which is supplementary UL (SUL), established in a low-frequency band. The supplementary UL (SUL) means a separately established UL so that data can be transmitted to a BS through a low-frequency band, in order to address coverage issues that may occur when a UE transmits/receives data using a high-frequency band.

In this case, the UE may perform, in the NR CC #1, PUCCH transmission for HARQ ACK/NACK feedback with respect to PDSCH transmission of the NR CC #2.

At this time, in a method of the BS for setting and a method of the UE for interpreting, a timing gap (e.g., k1 value) between the PDSCH transmission in the NR CC #2 and the PUCCH transmission for corresponding HARQ ACK/NACK feedback in the NR CC #1, as described above, the corresponding k1 value may be defined to be set by the BS and interpreted by the UE, based on the slot length of the NR CC #1 for transmitting the PUCCH including the corresponding HARQ ACK/NACK feedback in the NR CC #1. That is, in the example illustrated in FIG. 2, the k1 value may be set and interpreted, based on a unit of 1 ms, which is the UL slot length of the NR CC #1 for transmitting the PUCCH. At this time, a reference numerology served as a reference for composing timing relationship configuration information is the numerology of the NR CC #1 for transmitting the PUCCH.

Additionally, it may be necessary to define a reference point for applying corresponding k1 value, that is, a reference slot index. That is, as described above, it may be defined that timing gap information between the PDSCH transmission in the NR CC #2 and the PUCCH transmission in the NR CC #1 (e.g., SUL) including the corresponding HARQ ACK/NACK feedback of the UE is composed by the BS and interpreted by the UE, based on a unit of the TTI or slot length, of 1 ms of the CC #1 for transmitting/receiving the PUCCH. Thus, in a case where corresponding timing gap information is set to k1, it may be necessary to define a reference slot index in the NR CC #1 served as a reference point for counting a timing gap corresponding to k1 slots based on a unit of corresponding 1 ms slot.

For example, the reference slot index may be defined depending on a ratio between a SCS for transmitting corresponding PDSCH and a SCS for transmitting corresponding PUCCH. More specifically, when a SCS of an NR CC for PDSCH transmission is A kHz (in this Embodiment, 60 kHz of the NR CC #2), and a SCS of an NR CC for transmitting corresponding PUCCH is B kHz (in this Embodiment, 15 kHz of the NR CC #1), if a slot index for transmitting the PDSCH in the NR CC #2 is n, a reference slot index in an NR CC (e.g., the NR CC #1) for transmitting the PUCCH for counting the timing gap for transmitting the PUCCH, k1 slot(s), may be defined as $$\left\lfloor \frac{n \cdot B}{A} \right\rfloor.$$

Accordingly, when the timing gap information is set to the k1, a slot index through which the PDSCH is transmitted in the NR CC #2 is n, a slot index through which the PUCCH is transmitted in the NR CC #1 may be defined as $$\left\lfloor \frac{n \cdot B}{A} \right\rfloor + k1$$

depending on the timing gap, k1 value. In this case, for the number m, $\lfloor m \rfloor$ is a floor function, that is, the maximum integer less than or equal to m.

Alternatively, a reference slot index may be defined as a slot index of the NR CC #1 for transmitting PUCCH which overlaps with at least one symbol for transmitting PDSCH or completing the PDSCH transmission in the NR CC #2. In this case, when there are a plurality of slots of the NR CC #1 for performing the PUCCH transmission which overlap, in the time domain, with the at least one symbol for performing or completing the PDSCH transmission in the NR CC #2, it is possible to define the largest or the last slot index among the corresponding slots as a reference slot index, or the smallest or the first slot index as a reference slot index.

Embodiment 2. DCI Transmission Numerology/Time-Domain Scheduling Interval (or TTI) Based Timing Relation Indication Regardless of a time-domain scheduling interval for transmitting UL data or receiving DL data, the information on the timing relationship may be composed by a BS or interpreted by a UE based on a time-domain scheduling interval (or TTI) served as a transmission/reception unit for UL assignment or DL assignment DCI including scheduling information for the UL/DL data.

For example, it is assumed that a NR UE is configured to support carrier aggregation (CA) of the CC #1 of 15 kHz SCS and the CC #2 of 60 kHz SCS. In this case, a time-domain scheduling interval for each CC may be configured as follows. That is, when a time-domain scheduling interval based on a slot with y=14 is configured in CC #1 and a time-domain scheduling interval based on the slot with y=14 is also configured in CC #2, 1 ms time-domain scheduling interval (or TTI) may be configured in the CC #1 and 0.25 ms time-domain scheduling interval (or TTI) may be configured in the CC #2.

At this time, when cross-carrier scheduling is configured to use the CC #1 to transmit scheduling control information (DCI) for an UL/DL data channel of the CC #2, there occurs a difference between a time-domain scheduling interval (or TTI) of 0.25 ms served as a unit of data transmission/reception of the CC #2 and a time-domain scheduling interval (or TTI) of 1 ms for transmitting the DCI through the CC #1. In this case, contrary to the Embodiment 1, timing relationship (e.g., k value) between i) data transmission/reception in the CC #2 configured through the DCI or higher layer and ii) the DCI including corresponding scheduling information may be defined to be set by a BS/interpreted by a UE based on a unit of the time-domain scheduling interval (or TTI) of the CC #1 for transmitting the DCI.

That is, when the information on timing relationship is indication information on a timing gap in transmitting and receiving the DCI and corresponding data and when the timing gap is set to k, the timing relationship may be defined to transmit and receive corresponding data t after k slots (i.e., through a slot of the first CC #2 after k*1 ms) based on a unit of 1 ms slot of 15 kHz SCS which is the time-domain scheduling interval (or TTI) of the CC #1 for transmitting the DCI, not a unit of 0.25 ms slot of 60 kHz SCS which is the time-domain scheduling interval (or TTI) of the CC #2 for transmitting/receiving the data.

Embodiment 3. Explicit Reference Time-Domain Scheduling Interval (or TTI) Configuration Through Higher Layer or L1 Signaling As another method for synchronization between the timing relationship configuration of the BS and the timing relationship interpretation of the UE, it is possible for the BS to configure, semi-statically through higher layer signaling or dynamically through L1 signaling (e.g., L1/L2 control channel), a reference time-domain scheduling interval (or TTI) served as a reference of corresponding timing relationship indication.

As an example of configuring, semi-statically through the higher layer signaling or dynamically through the L1 signaling (e.g., L1/L2 control channel), the reference time-domain scheduling interval (or TTI), the configuration may be performed based on a unit of a reference numerology and the number of OFDM symbols. Alternatively, the configuration may be performed based on a time unit of ms, such as 1 ms, 0.5 ms, 0.25 ms, 0.125 ms, etc. served as a slot length for each numerology.

Figure 5:
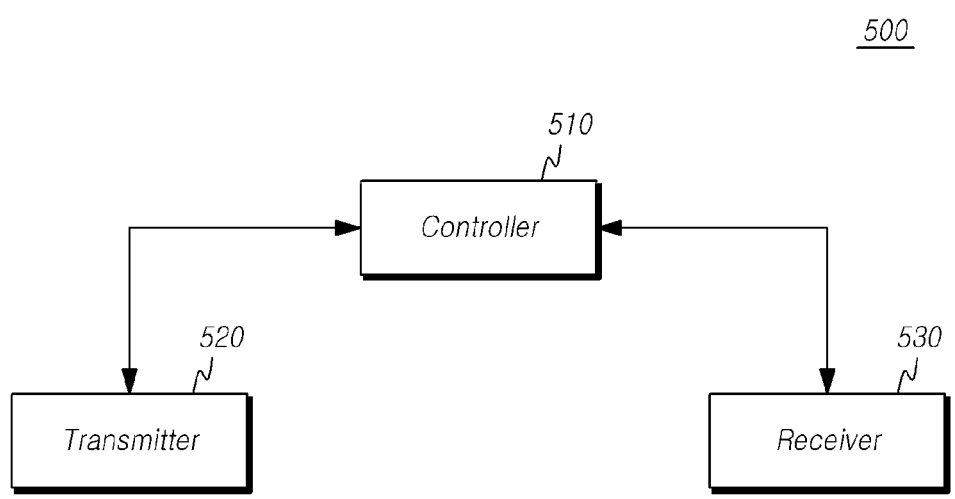
FIG. 5 is a block diagram illustrating a base station according to at least one embodiment of the present disclosure.

FIG. 5 is a block diagram illustrating a BS 500 according to an embodiment of the present disclosure.

Referring to FIG. 5, the BS 500 according to an embodiment includes a controller 510, a transmitter 520 and a receiver 530.

The controller 510 is configured to compose timing relationship configuration information between a DL data channel (PDSCH) and an UL control channel (PUCCH). The timing relationship configuration information may be contained in DL control information (DCI) transmitted through the DL control channel. In addition, the timing relationship configuration information may be transmitted to a UE through high layer signaling.

The uplink control channel (PUCCH) includes HARQ ACK/NACK feedback information on the downlink data channel (PDSCH). A numerology used for transmitting the downlink data channel (PDSCH) and a numerology used for receiving the uplink control channel (PUCCH) are different from each other. At this time, the timing relationship configuration information may be composed in a slot unit based on the numerology used for receiving the UL control channel. In this case, even though the DL data channel is transmitted on a per minislot basis, the UL data control channel may be received only on a per slot basis.

At this time, when the UE uses carrier aggregation, a component carrier used for transmitting the DL data channel may be different from a component carrier used for receiving the UL control channel, by the BS. On the contrary, when the UE does not use the carrier aggregation and when time domain scheduling intervals in the UL and the DL are configured different from each other, a carrier used for transmitting the DL data channel may be the same as that used for receiving the UL control channel. When the UL control channel is transmitted to the BS, the UL control channel may be transmitted through supplementary UL (SUL) used for transmitting the UL control channel.

The transmitter 520 and the receiver 530 are used to transmit to and receive from a UE, signals, messages, and data necessary for carrying out the present disclosure described above.

The transmitter 520 is configured to transmit the timing relationship configuration information to the UE. The UE may schedule the UL control channel based on the timing relationship configuration information received form the BS.

Figure 6:
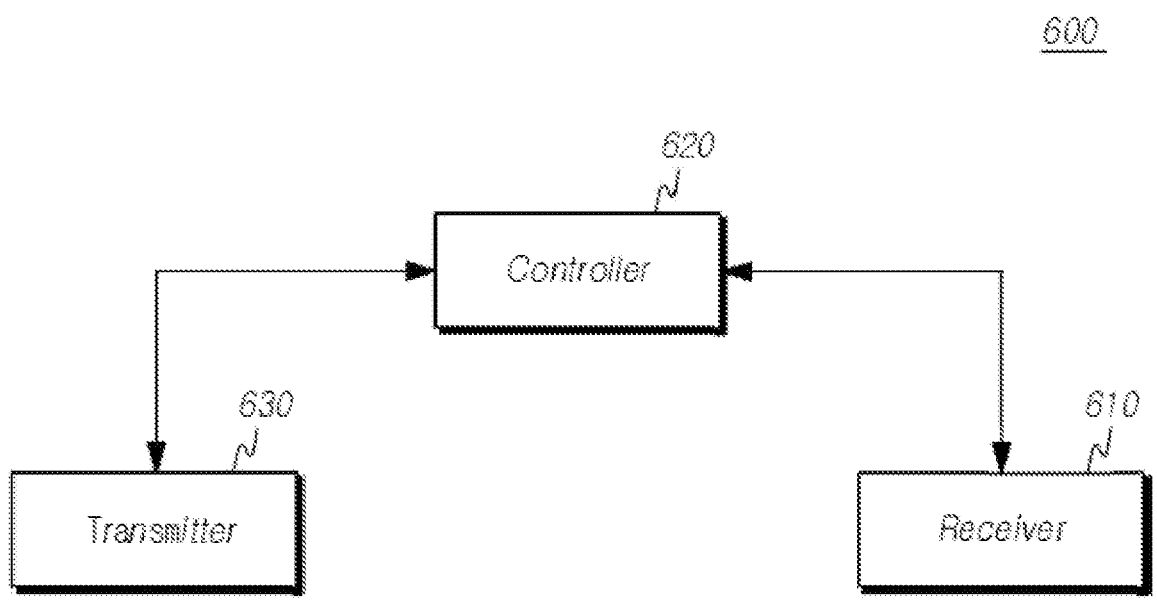
FIG. 6 is a block diagram illustrating a user equipment according to at least one embodiment of the present disclosure.

FIG. 6 is a block diagram illustrating a UE 600 according to an embodiment of the present disclosure.

Referring to FIG. 6, the UE 600 according to another embodiment includes a receiver 610, a controller 620 and a transmitter 630.

The receiver 610 is configured to receive DL control information and data, messages through a corresponding channel from a BS. More specifically, the receiver 610 is configured to receive timing relationship configuration information between a DL data channel (PDSCH) and an UL control channel (PUCCH).

At this time, the timing relationship configuration information may be contained in DL control information (DCI) received through the DL control channel. In addition, the timing relationship configuration information may be transmitted to the UE through high layer signaling.

The controller 620 is configured to schedule the UL control channel based on the timing relationship configuration information received from the BS.

The UL control channel (PUCCH) includes HARQ ACK/NACK feedback information on the DL data channel (PDSCH). A numerology used for receiving the DL data channel (PDSCH) and a numerology used for transmitting the UL control channel (PUCCH) are different from each other. At this time, the timing relationship configuration information may be composed in a slot unit based on the numerology used for receiving the UL control channel. In this case, even though the DL data channel is received on a per minislot basis, the UL data control channel may be transmitted only on a per slot basis. In this case, even though the DL data channel is transmitted on a per minislot basis, the UL data control channel may be received only on a per slot basis.

When the UE uses carrier aggregation, a component carrier used for receiving the DL data channel may be different from a component carrier used for transmitting the UL control channel. On the contrary, when the UE does not use the carrier aggregation and when time domain scheduling intervals in the UL and the DL are configured different from each other, a carrier used for receiving the DL data channel may be the same as that used for transmitting the UL control channel. When the UL control channel is transmitted to the BS, the UL control channel may be transmitted through supplementary UL (SUL) used for transmitting the UL control channel.

The transmitter 630 is configured to transmit UL control information and data, messages through a corresponding channel to the BS.

The standardized specifications or standard documents related to the embodiments described above have been omitted in order to simplify the description but constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

The invention claimed is:

1. An operation method of a user equipment, the method comprising:
   receiving, from a base station via a physical downlink control channel (PDCCH), downlink control information (DCI) including timing relationship configuration information between a downlink (DL) and an uplink (UL) for a hybrid automatic repeat request (HARQ) acknowledgement/negative acknowledgement (ACK/NACK) feedback; and
   transmitting, to the base station, uplink control information via a physical uplink control channel (PUCCH) in a slot based on the timing relationship configuration information, wherein the uplink control information includes HARQ ACK/NACK feedback information with respect to a downlink data via a physical downlink shared channel (PDSCH), and wherein at least one, among plural subcarrier spacings (SCSs) including a first SCS for the DL and a second SCS for the UL, is selected as a reference.

2. The method according to claim 1, wherein the timing relationship configuration information is configured in a slot unit based on the second SCS for the UL.

3. The method according to claim 1, wherein a reference slot for the timing relationship configuration information is determined to be a slot that overlaps with a slot used for the DL.

4. The method according to claim 1, wherein, if a plurality of slots overlap with a slot used for the DL, a reference slot for the timing relationship configuration information is determined to be a last slot among the plurality of slots.

5. The method according to claim 1, wherein the timing relationship configuration information is received from the base station through high layer signaling.

6. A base station comprising:
a receiver;
a transmitter; and
a controller which controls the receiver and the transmitter to:
  determine timing relationship configuration information between a downlink (DL) and an uplink (UL) for a hybrid automatic repeat request (HARQ) acknowledgement/negative acknowledgement (ACK/NACK) feedback;
  transmit, via a physical downlink control channel (PDCCH), downlink control information (DCI) including the timing relationship configuration information to a user equipment; and
  receive, from the user equipment, uplink control information via a physical uplink control channel (PUCCH) in a slot based on the timing relationship configuration information,
wherein the uplink control information includes HARQ ACK/NACK feedback information, with respect to a downlink data via a physical downlink shared channel (PDSCH), and
wherein at least one, among plural subcarrier spacings (SCSs) including a first SCS for the DL and a second SCS for the UL, is selected as a reference.

7. The base station according to claim 6, wherein the timing relationship configuration information is configured in a slot unit based on the second SCS for the UL.

8. The base station according to claim 6, wherein a reference slot for the timing relationship configuration information is determined to be a slot that overlaps with a slot used for the DL.

9. A user equipment comprising:
a receiver;
a transmitter; and
a controller which controls the receiver and the transmitter to:
  receive, from a base station via a physical downlink control channel (PDCCH), downlink control information (DCI) including timing relationship configuration information between a downlink (DL) and an uplink (UL) for a hybrid automatic repeat request (HARQ) acknowledgement/negative acknowledgement (ACK/NACK) feedback; and
  transmit, to the base station, uplink control information via a physical uplink control channel (PUCCH) in a slot based on the timing relationship configuration information,
wherein the uplink control information includes HARQ ACK/NACK feedback information with respect to a downlink data via a physical downlink shared channel (PDSCH), and
wherein at least one, among plural subcarrier spacings (SCSs) including a first SCS for the DL and a second SCS for the UL, is selected as a reference.

10. The user equipment according to claim 9, wherein the timing relationship configuration information is configured in a slot unit based on the second SCS for the UL.

11. The user equipment according to claim 9, wherein a reference slot for the timing relationship configuration information is determined to be a slot that overlaps with a slot used for the DL.

12. The user equipment according to claim 9, if a plurality of slots overlap with a slot used for the DL, a reference slot for the timing relationship configuration information is determined to be a last slot among the plurality of slots.

13. The user equipment according to claim 9, wherein the timing relationship configuration information is received from the base station through high layer signaling.

* * * * *